(12) United States Patent
Nakase et al.

(10) Patent No.: US 7,139,770 B2
(45) Date of Patent: Nov. 21, 2006

(54) SPATIAL DATA ANALYSIS APPARATUS AND SPATIAL DATA ANALYSIS METHOD

(75) Inventors: Akihiko Nakase, Tokyo (JP); Hisaaki Hatano, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 462 days.

(21) Appl. No.: 10/379,919

(22) Filed: Mar. 6, 2003

(65) Prior Publication Data

US 2003/0187875 A1 Oct. 2, 2003

(30) Foreign Application Priority Data

Mar. 6, 2002 (JP) .............................. 2002-059735

(51) Int. Cl.
*G06F 17/30* (2006.01)
(52) U.S. Cl. .................................... 707/102
(58) Field of Classification Search ............. 707/104.1; 715/854
See application file for complete search history.

(56) References Cited

U.S. PATENT DOCUMENTS

| | | | | |
|---|---|---|---|---|
| 5,533,183 A | * | 7/1996 | Henderson et al. | 715/854 |
| 6,408,292 B1 | * | 6/2002 | Bakalash et al. | 707/2 |
| 6,606,621 B1 | * | 8/2003 | Hopeman et al. | 707/3 |
| 6,611,751 B1 | * | 8/2003 | Warren | 701/200 |
| 6,732,120 B1 | * | 5/2004 | Du | 707/104.1 |

OTHER PUBLICATIONS

J. R. Quinlan, The Morgan Kauffmann series in machine learning, ISBN: 1558602380, pp. 1-29, "C4.5: Programs for Machine Learning", 1993.
U.S. Appl. No. 10/379,919, filed Mar. 6, 2003, Nakase et al.
U.S. Appl. No. 10/860,037, filed Jun. 4, 2004, Hatano et al.

* cited by examiner

*Primary Examiner*—Diane D. Mizrahi
(74) *Attorney, Agent, or Firm*—Oblon, Spivak, McClelland, Maier & Neustadt, P.C.

(57) ABSTRACT

A spatial data analysis apparatus includes a storage configured to store a record group of records each including a multi-dimensional spatial attribute containing a place and a description attribute regarding the spatial attribute; a divider configured to divide the record group into a plurality of virtual record groups corresponding to a plurality of places according to each of a plurality of conditions determined by the description attribute; a calculator configured to calculate a degree of spatial dispersion of records of each of the plurality of virtual record groups in the places to obtain a plurality of degrees of dispersion; and a selector configured to select from the conditions a condition corresponding to a virtual record group that indicates a lowest degree of dispersion among the degrees of dispersion. The divider re-divides the virtual record group into a plurality of re-divided virtual record groups, and the calculator computes a degree of spatial dispersion of records of each of the re-divided virtual record groups that are recursively generated by re-dividing recursively the virtual record group with the divider, to make a tree structure for determining a final division condition and a final virtual record group.

15 Claims, 5 Drawing Sheets

Taxi riding record

| No. | X | Y | Time | Weather |
|-----|----|----|-------|---------|
| 1 | 30 | 90 | 9:00 | Fine |
| 2 | 40 | 80 | 8:00 | Fine |
| 3 | 10 | 70 | 9:00 | Rain |
| 4 | 40 | 40 | 10:00 | Rain |
| 5 | 60 | 90 | 9:00 | Fine |
| 6 | 60 | 60 | 21:00 | Fine |
| 7 | 70 | 90 | 12:00 | Fine |
| 8 | 80 | 70 | 22:00 | Rain |
| 9 | 80 | 30 | 18:00 | Rain |
| 10 | 90 | 30 | 21:00 | Rain |

| No. | X | Y | Time | Weather |
|---|---|---|---|---|
| 1 | 30 | 90 | 9:00 | Fine |
| 2 | 40 | 80 | 8:00 | Fine |
| 5 | 60 | 90 | 9:00 | Fine |
| 6 | 60 | 60 | 21:00 | Fine |
| 7 | 70 | 90 | 12:00 | Fine |

---

| No. | X | Y | Time | Weather |
|---|---|---|---|---|
| 3 | 10 | 70 | 9:00 | Rain |
| 4 | 40 | 40 | 10:00 | Rain |
| 8 | 80 | 70 | 22:00 | Rain |
| 9 | 80 | 30 | 18:00 | Rain |
| 10 | 90 | 30 | 21:00 | Rain |

FIG. 5

| No. | X | Y | Time | Weather |
|---|---|---|---|---|
| 2 | 40 | 80 | 8:00 | Fine |
| 1 | 30 | 90 | 9:00 | Fine |
| 3 | 10 | 70 | 9:00 | Rain |
| 5 | 60 | 90 | 9:00 | Fine |
| 4 | 40 | 40 | 10:00 | Rain |
| 7 | 70 | 90 | 12:00 | Fine |
| 9 | 80 | 30 | 18:00 | Rain |
| 10 | 90 | 30 | 21:00 | Rain |
| 6 | 60 | 60 | 21:00 | Fine |
| 8 | 80 | 70 | 22:00 | Rain |

| No. | X | Y | Time | Weather |
|---|---|---|---|---|
| 2 | 40 | 80 | 8:00 | Fine |
| 1 | 30 | 90 | 9:00 | Fine |
| 3 | 10 | 70 | 9:00 | Rain |
| 5 | 60 | 90 | 9:00 | Fine |
| --- | --- | --- | --- | --- |
| 4 | 40 | 40 | 10:00 | Rain |
| 7 | 70 | 90 | 12:00 | Fine |
| 9 | 80 | 30 | 18:00 | Rain |
| 10 | 90 | 30 | 21:00 | Rain |
| 6 | 60 | 60 | 21:00 | Fine |
| 8 | 80 | 70 | 22:00 | Rain |

FIG. 7

| No. | X | Y | Time | Weather |
|---|---|---|---|---|
| 2 | 40 | 80 | 8:00 | Fine |
| 1 | 30 | 90 | 9:00 | Fine |
| 3 | 10 | 70 | 9:00 | Rain |
| 5 | 60 | 90 | 9:00 | Fine |
| 4 | 40 | 40 | 10:00 | Rain |
| --- | --- | --- | --- | --- |
| 7 | 70 | 90 | 12:00 | Fine |
| 9 | 80 | 30 | 18:00 | Rain |
| 10 | 90 | 30 | 21:00 | Rain |
| 6 | 60 | 60 | 21:00 | Fine |
| 8 | 80 | 70 | 22:00 | Rain |

FIG. 8

| No. | X | Y | Time | Weather |
|---|---|---|---|---|
| 2 | 40 | 80 | 8:00 | Fine |
| 1 | 30 | 90 | 9:00 | Fine |
| 3 | 10 | 70 | 9:00 | Rain |
| 5 | 60 | 90 | 9:00 | Fine |
| 4 | 40 | 40 | 10:00 | Rain |
| 7 | 70 | 90 | 12:00 | Fine |
| --- | --- | --- | --- | --- |
| 9 | 80 | 30 | 18:00 | Rain |
| 10 | 90 | 30 | 21:00 | Rain |
| 6 | 60 | 60 | 21:00 | Fine |
| 8 | 80 | 70 | 22:00 | Rain |

FIG. 9

| No. | X | Y | Time | Weather |
|---|---|---|---|---|
| 2 | 40 | 80 | 8:00 | Fine |
| 1 | 30 | 90 | 9:00 | Fine |
| 3 | 10 | 70 | 9:00 | Rain |
| 5 | 60 | 90 | 9:00 | Fine |
| 4 | 40 | 40 | 10:00 | Rain |
| 7 | 70 | 90 | 12:00 | Fine |

FIG. 10

| No. | X | Y | Time | Weather |
|---|---|---|---|---|
| 9 | 80 | 30 | 18:00 | Rain |
| 10 | 90 | 30 | 21:00 | Rain |
| 6 | 60 | 60 | 21:00 | Fine |
| 8 | 80 | 70 | 22:00 | Rain |

FIG. 11

| No. | X | Y | Time | Weather |
|---|---|---|---|---|
| 2 | 40 | 80 | 8 | Fine |
| 1 | 30 | 90 | 9 | Fine |
| 5 | 60 | 90 | 9 | Fine |
| 7 | 70 | 90 | 12 | Fine |
| --- | --- | --- | --- | --- |
| 4 | 40 | 40 | 10 | Rain |
| 3 | 10 | 70 | 9 | Rain |

FIG. 12

| No. | X | Y | Time | Weather |
|---|---|---|---|---|
| 2 | 40 | 80 | 8:00 | Fine |
| 1 | 30 | 90 | 9:00 | Fine |
| 3 | 10 | 70 | 9:00 | Rain |
| 5 | 60 | 90 | 9:00 | Fine |
| --- | --- | --- | --- | --- |
| 4 | 40 | 40 | 10:00 | Rain |
| 7 | 70 | 90 | 12:00 | Fine |

SPATIAL DATA ANALYSIS APPARATUS AND SPATIAL DATA ANALYSIS METHOD

CROSS-REFERENCE TO RELATED APPLICATIONS

This application is based upon and claims the benefit of priority from the prior Japanese Patent Application No. 2002-059735, filed on Mar. 6, 2002, the entire contents of which are incorporated herein by reference.

BACKGROUND OF THE INVENTION

1. Field of the Invention

The present invention relates to a spatial data analysis apparatus that analyzes two- or more-dimensional spatial data, particularly to a spatial data analysis apparatus that analyzes a place where events congest spatially and a condition to search for the place, and a method therefor.

2. Description of the Related Art

In data having two- or more-dimensional spatial coordinates such as GIS (Geographic Information System) data and map data as attribute, when each record of data is selected under a certain condition (except for condition regarding spatial coordinates), it is an important application in a spatial data analysis to find a condition that the selected records congest spatially.

Figure 1:
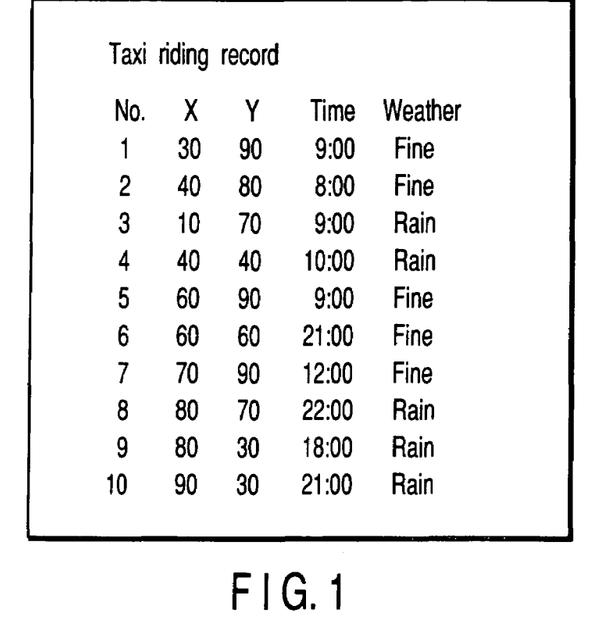
FIG. 1 shows data of a taxi riding record (a group of records)

FIG. 1 shows taxi riding data as an example which two-dimensional position information is included in each record of a database. The data is data representing a place and a time at which a taxi picked up a passenger, and weather at that time, data representing the place that picked up the passenger are shown by X and Y coordinates.

Figure 2:
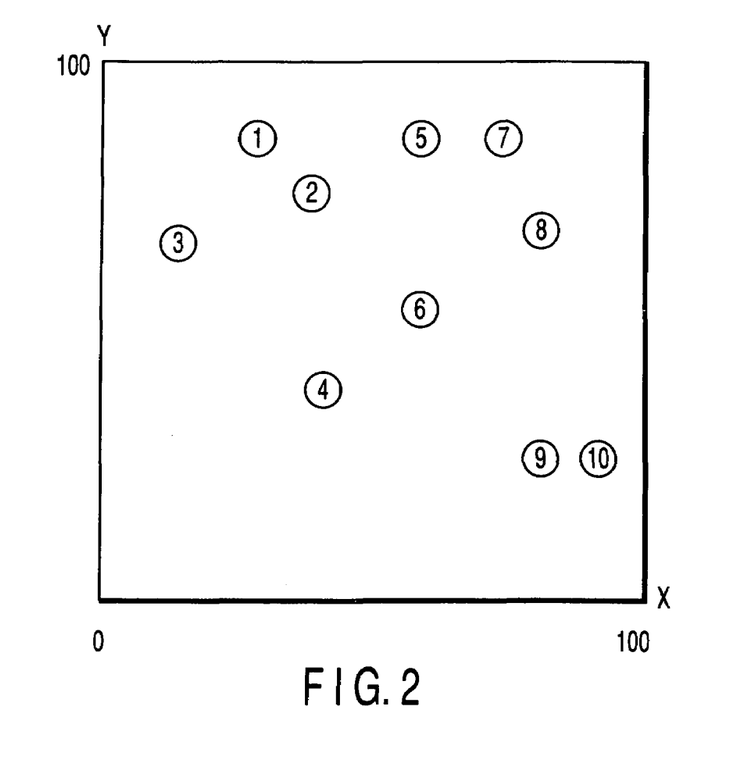
FIG. 2 is a diagram of an XY coordinate space in which the group of records shown in FIG. 1 is depicted.
Figure 3:
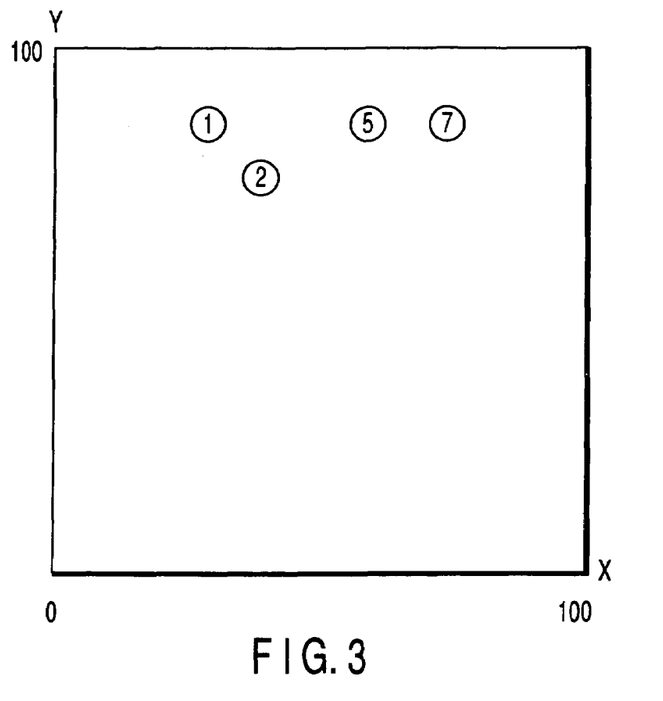
FIG. 3 is a diagram of an XY coordinate space that described only record satisfying a condition of "before 12:00 in a fine day" (except for items regarding spatial coordinates) in a group of records of FIG. 1.

When the places represented by these data are plotted in an XY coordinate space, distribution of the places is provided as shown in FIG. 2. From this chart, a remarkable trend cannot be found. However, when only data to satisfy a condition except for spatial coordinates such as "before 12:00 in a fine day" are plotted in the XY coordinate space, the data are distributed as shown in FIG. 3. It is understand from FIG. 3 to show a tendency that data congest towards the upper part of FIG. 3. When this trend is used, a passenger is easy to pick up in the morning of a fine day on an area shown in the upper part of FIG. 3. Accordingly, the effective taxi allocation, such as the concentration of empty taxis on that area, can be achieved.

On the other hand, a technique for extracting knowledge that is hidden in a large amount of data obtained by analysis is known as a data mining technique. A decision tree generation method is known as a representative technique. A tree is created to have as a node a condition for classifying records in a database. A new record is applied from the root of the tree to classify the record. In the decision tree, a tree structure is created on the basis of data in a table format (called a training set). A plurality of attributes and one class are assigned to the data in the table format. Each attribute is used for classifying each record into one of the class. Each attribute may take a category value (categorical value) or continuous value.

According to the method of creating a decision tree, nodes are so generated as to optimally divide a training set from the root of the tree, and the training set is divided in accordance with this division. Nodes are then repeatedly generated to further optimally divide the divided training sets.

By the way, when the data mining is performed for information including spatial data by a decision tree generation technique based on a class classification, in other words, when information representing "corresponding data belongs to which spatial area when a certain condition (except for a condition regarding spatial coordinates) is designated" is subjected to the data mining by the decision tree generation method, it needs to preprocess the two- or more-dimensional spatial area to a one-dimensional class.

When spatial data is preprocessed and analyzed by the decision tree generation method based on the class classification, there are problems that precision of convention to be provided as a result becomes bad.

As described above, when spatial information is coded by preprocessing, and then analyzed, quantity of information is reduced in a stage of encoding the spatial information. For this reason, precision of data mining result was degraded. It is thought that the reason is because range of a place at which data are congested by preprocessing is fixed. Because the place where data are dense is looked for, class classification is performed by only the degree that the congestion is concluded whereby segmentation of the class is limited.

BRIEF SUMMARY OF THE INVENTION

It is an object of the present invention to provide a spatial data analysis apparatus used for finding a place where data having a spatial attribute are dense and a condition for looking for the place of dense data, and a spatial data analysis method therefor.

According to a first aspect of the invention, there is provided a spatial data analysis apparatus comprising: a receiving unit configured to receive a record group of records each including a multi-dimensional spatial attribute and a description attribute regarding the spatial attribute; a virtual division unit configured to divide the record group according to a first division condition determined by the description attribute to generate a plurality of virtual record groups; and a determination unit configured to obtain a degree of spatial dispersion of records of each of the plurality of virtual record groups and determine a second division condition and a virtual record group that indicate a lowest degree of dispersion.

According to a second aspect of the invention, there is provided a spatial data analysis method comprising: receiving a record group of records each including a multi-dimensional spatial attribute and a description attribute regarding the spatial attribute; dividing the record group according to a first division condition determined by the description attribute to generate a plurality of virtual record groups each including a plurality of records; calculating a degree of spatial dispersion of records of each of the plurality of virtual record groups; and determining a second division condition and a virtual record group that indicate a lowest degree of dispersion.

DETAILED DESCRIPTION OF THE INVENTION

There will now be described an embodiment of the present invention in conjunction with accompanying drawings.

Figure 4:
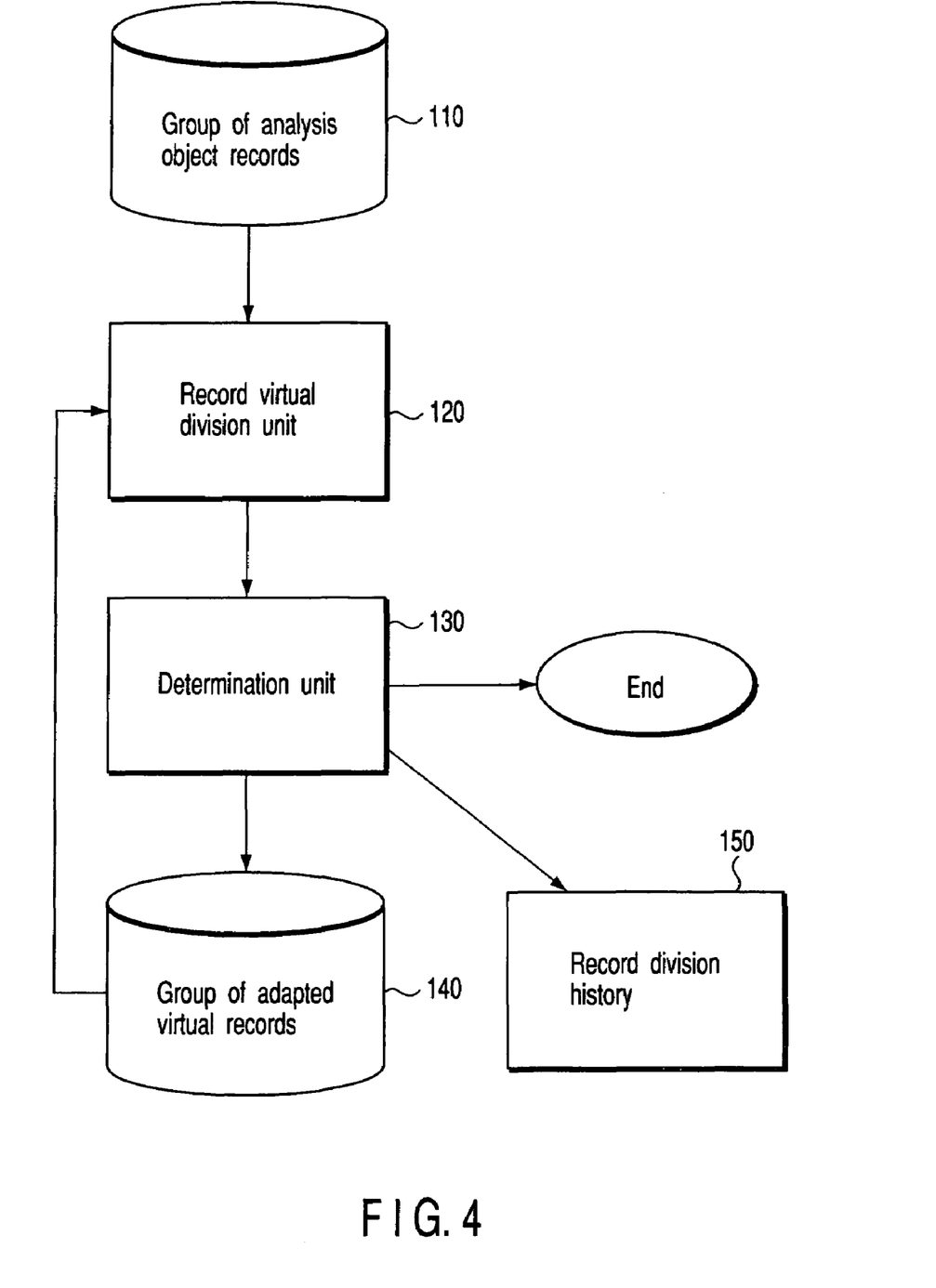
FIG. 4 is a block diagram of a spatial data analysis apparatus concerning an embodiment of the present invention.

FIG. 4 is a block diagram of a spatial data analysis apparatus concerning an embodiment of the present invention. A storage 110 for a group of object data records stores a group of records having a two- or more-dimensional space attribute that indicates an object data and this description attribute. A record virtual division unit 120 virtually divides a group of records every record with a division condition according to a description attribute. A determination unit 130 determines whether a group of virtual records virtually divided is spatially dispersed with a low degree of dispersion, that is, whether they are congested on a place. A division condition that the records congest most spatially is selected. A group of selected virtual records is temporarily stored in a temporary storage unit 140. The group of selected virtual records is repeatedly divided in a record virtual division unit 120 recursively.

When the determination unit 130 determines that the group of records cannot furthermore be divided, it stops a division of the group of records. Also, the determination unit 130 finishes a data analysis process if it is impossible to divide all record groups.

The operation histories of the record virtual division unit 120 and determination unit 130 are stored in a record group division history storage unit 150, and becomes knowledge obtained as a result.

There will now be described a process for finding knowledge regarding a taxi rising trend using a taxi riding record shown in FIG. 1 as an object data. In other words, in a rule of "taxi riding data to satisfy a certain condition (except for a condition regarding a coordinates space) congests on a certain spatial area", both of "a certain condition (except for a condition regarding a spatial coordinate)" and "a certain spatial area" are found.

Taxi riding recorded data of FIG. 1 is stored in the storage 110 for a group of object data records that is shown in FIG. 4. The data include X and Y coordinates of a place where a passenger picked up a taxi as a spatial attribute, and a time when a passenger pick up the taxi and a weather in the time as another description attribute. The data is virtually divided by a record virtual division unit 120. The determination unit 130 calculates a degree of dispersion of records with respect to a group of virtual records.

Assuming that n record groups as an object data are referred to R1, R2 . . . Rn and the center of gravity of all groups is as P, the X and Y coordinates of the center P of gravity are represented as $Px=\Sigma Xn/n$, and $Py=\Sigma Yn/n$, when X and Y coordinates of n records are (Xn, Yn).

The sum of values each obtained by the square of a distance Lk from the center of gravity P to each record k (k=1 . . . n) is the sum of values each obtained by the square of a distance between a position (Xk, Yk) indicated by X and Y attributes of each record and a position (Px, Py) indicated by X and Y attributes of the center of gravity P.

The smallest n of record groups assumes 2. In other words, assume that the place where there are not two or more records is not defined as the congestion of records. In the taxi riding record of FIG. 1, there are raiding records at ten spots, the center of gravity of all spots is (56,64). The degree of dispersion of all records is the sum of results each obtained by the square of a distance from each of the spots to the center of gravity, that is, 11090.

An example for dividing the taxi riding record of FIG. 1 by the record virtual division unit 120 is explained. The record virtual division unit 120 divides the record group according to an attribute (description attribute) except for X and Y coordinates showing a position of object data.

The taxi riding record of FIG. 1 can be divided according to a weather attribute and a time attribute. In the case of dividing the record with the weather attribute, because the weather attribute is a discrete value attribute having two kinds of attribute values, that is, "fine" and "rain" attribute values, it is virtually divided into a record group of "weather=fine" and a record group of "weather=rain."

Figure 5:
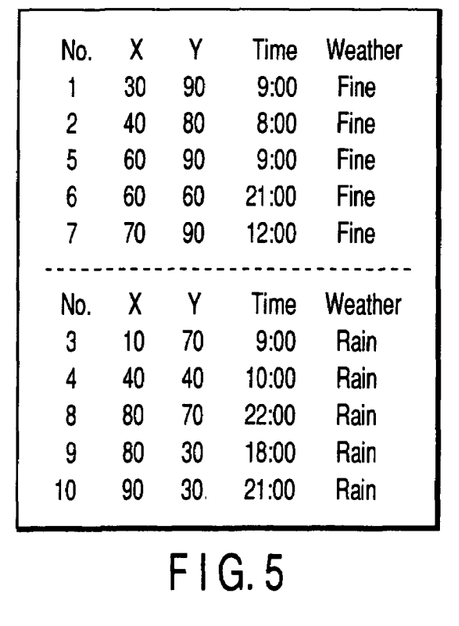
FIG. 5 is a diagram for explaining a first division candidate (divided by a weather attribute) of a group of records of FIG. 1.

Since each of two divided virtual record groups has two or more records as shown in FIG. 5, they are the first division candidates. In the case of dividing the record with the time attribute, there are a large number of points to be divided, because the time attribute has attribute values continuing between 0:00 and 24:00.

Figure 6:
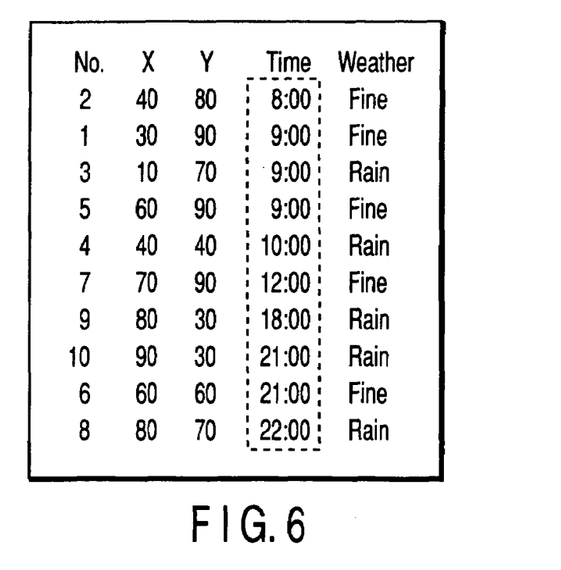
FIG. 6 shows a group of records that the group of records of FIG. 1 are sorted by a time attribute.
Figure 7:
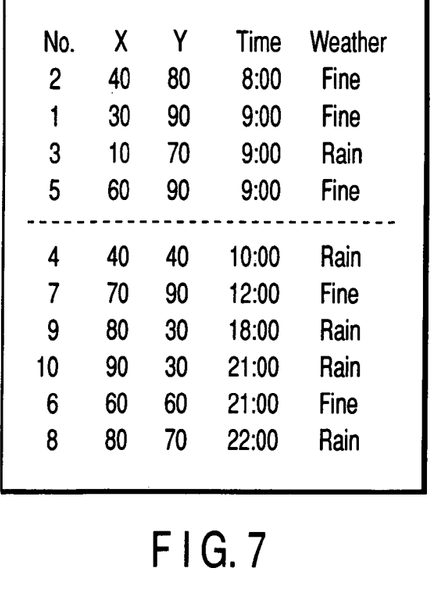
FIG. 7 is a diagram for explaining a second division candidate (divided between 9:00 and 10:00) of the group of records of FIG. 1.
Figure 8:
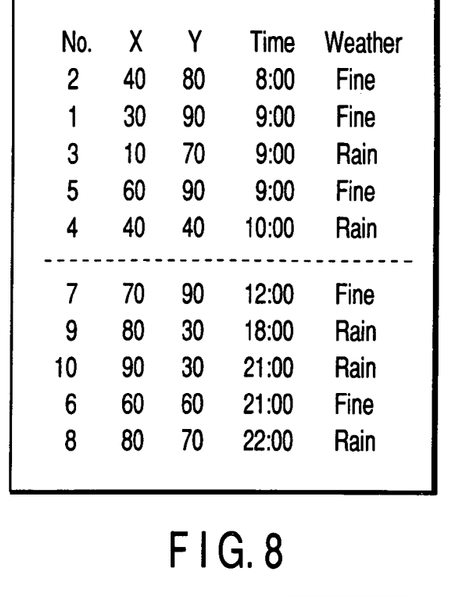
FIG. 8 is a diagram for explaining a third division candidate (divided between 10:00 and 12:00) of the group of records of FIG. 1.

At first all records are sorted by the time attribute as shown in FIG. 6. Considering that the smallest n forming the record group is 2 and assuming that the record of the same time is not divided. In this case, the second division candidate to divide the record between 9:00 and 10:00 (FIG. 7), the third division candidate to divide the record between 10:00 and 12:00 (FIG. 8) and the fourth division candidate to divide the record between 12:00 and 18:00 (FIG. 9) are formed.

Next, the determination unit 130 determines the dispersion degree of the record group with respect to each division candidate.

In the first division candidate (FIG. 5), the center of gravity of the group of virtual records of "weather=fine" is (52, 82). The sum of results each obtained by the square of a distance from the center of gravity of the group of virtual records to the center of gravity P of all records is 1760.

On the other hand, The center of gravity of the group of virtual records of "weather=rain" is (60, 46), and the sum of results each obtained by the square of distance from the center of gravity of the group of virtual records to the center of gravity P of all record is 6280. As a result, the record degree of dispersion of the first division candidate is 1760+ 6280=8040.

In the second division candidate (FIG. 7), the center of gravity of the group of virtual records of "time≦9:00" is (35, 82.5). The sum of the results each obtained by the square of distance between the center of gravity of the group of virtual records and the center of gravity P of all records is 1575. The center of gravity of the group of virtual records of "time≧10:00" is (70, 51.7). The sum of results each obtained by the square of a distance from the center of gravity of the group of virtual records to the center of gravity P of all records is 4533. As a result, the degree of record dispersion of the second division candidate is 1575+4533=6108.

In the third division candidate (FIG. 8), the center of gravity of the group of virtual records of "time≧10:00" is (36, 72). The sum of results each obtained by the square of a distance from the center of gravity of the group of virtual records to the center of gravity P of all records is 3040. The center of gravity of the group of virtual records of "time≧12:00" is (70, 51.7). The sum of results each obtained by the square of a distance from the center of gravity of the group of virtual records to the center of gravity P of all records is 3240. As a result, the degree of record dispersion of the third division candidate is 3040+3240=6280.

In the fourth division candidate (FIG. 9), the center of gravity of the group of virtual records of "time≦12:00" is (42, 75). The sum of results each obtained by the square of a distance from the center of gravity of the group of virtual records to the center of gravity P of all records is 4217. The center of gravity of the group of virtual records of "time≧18:00" is (70, 51.7). The sum of results each obtained by the square of a distance from the center of gravity of the group of virtual records to the center of gravity P of all records is 1750. As a result, the degree of record dispersion of the third division candidate is 4217+1750=5967.

Figure 9:
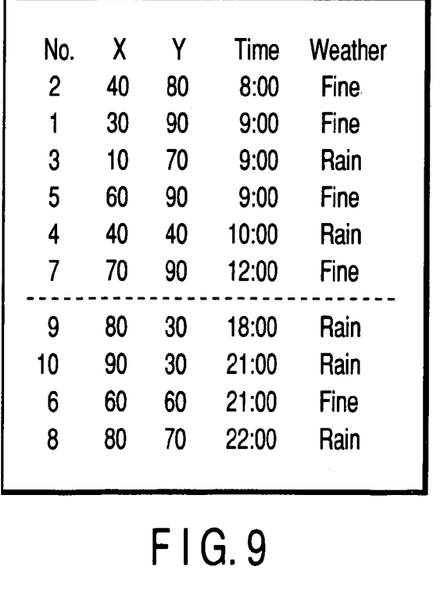
FIG. 9 is a diagram for explaining a fourth division candidate (divided between 12:00 and 18:00) of the group of records of FIG. 1.

The division candidate that the degree of record dispersion is the lowest among four division candidates, that is, the division candidate that the records most congest is the fourth division candidate. A group of virtual records divided by the fourth division candidate is selected and temporarily stored in the temporary storage unit.

Figure 10:
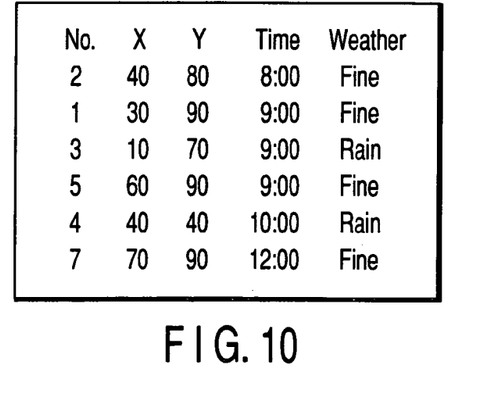
FIG. 10 shows data of a group of records of a taxi riding record (1) divided by the fourth taxi division candidate.
Figure 11:
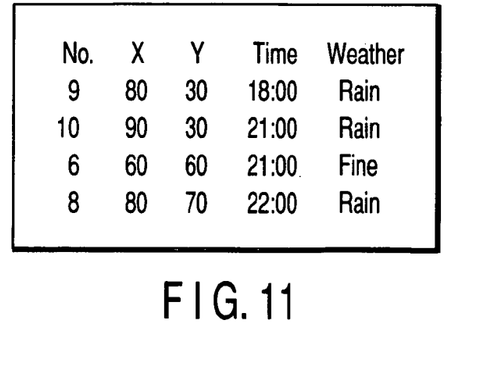
FIG. 11 shows data of a group of records of a taxi riding record (2) divided by the fourth taxi division candidate.

In this stage, the group of virtual records (the upper part of the fourth division candidate (FIG. 9)) satisfying a condition of "time≦12:00" includes taxi riding records divided as shown in FIG. 10. The group of virtual records (the upper part of the fourth division candidate (FIG. 9)) satisfying a condition of "time≧18:00" includes taxi riding records divided as shown in FIG. 11. To divide the record under the conditions of "time≧18:00" and "time≦12:00 is recorded as the first division in the record division history storage unit 150.

The divided taxi riding record (FIG. 10) and the divided taxi riding record (FIG. 11) are recursively processed by the record virtual division unit 120 and determination unit 130.

Figures 12, 13, 14:
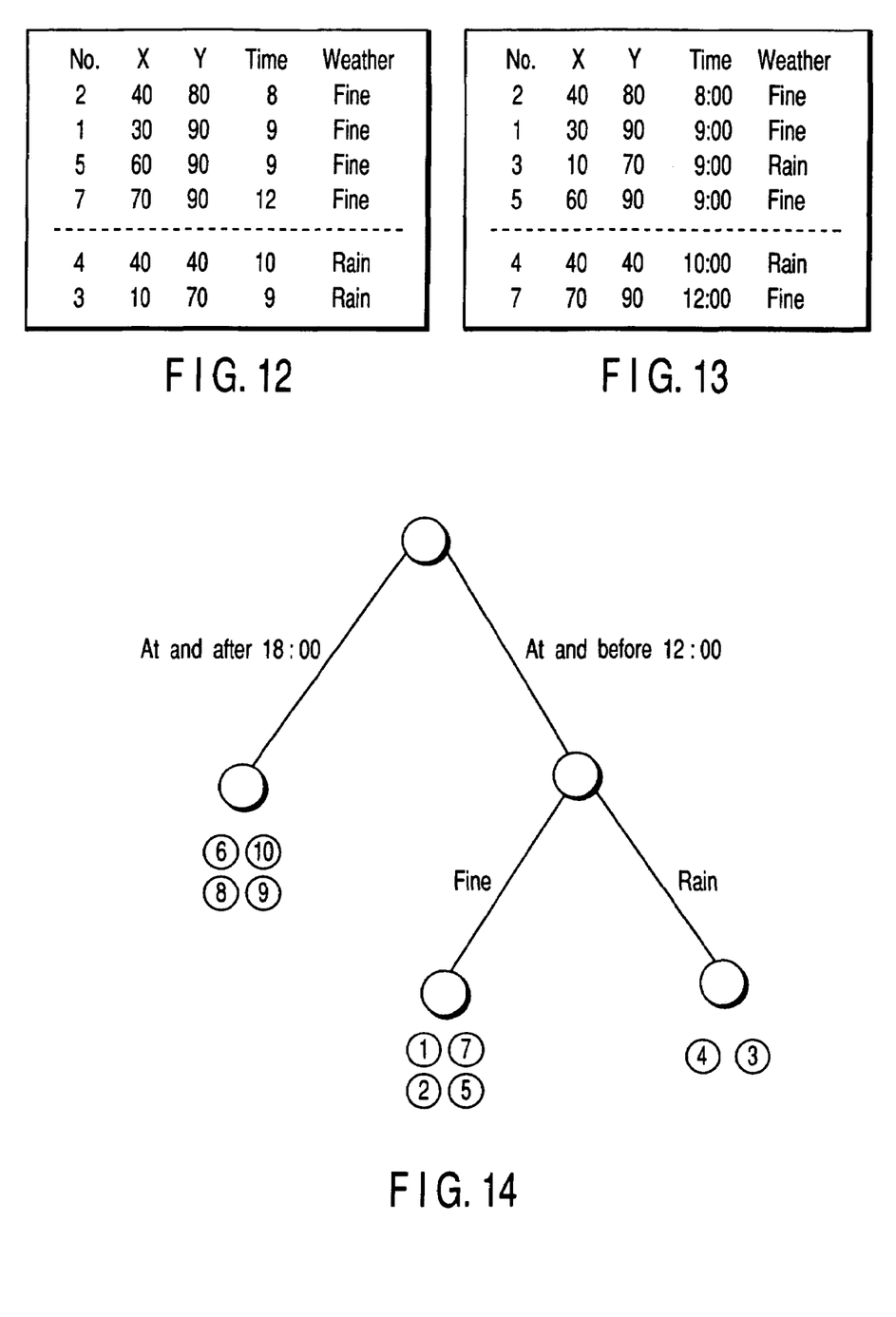
FIG. 12 is a diagram for explaining a candidate splitting a group of records of FIG. 10 with a weather attribute.
FIG. 13 is a diagram of explaining a candidate splitting a group of record of FIG. 10 with a time attribute.
FIG. 14 shows a decision tree structure generated by a spatial data analysis apparatus concerning the present embodiment.

With respect to data of the taxi riding record (FIG. 10), a candidate for dividing the record with the weather attribute as shown in FIG. 12 and a candidate for dividing the record with the time attribute as shown in FIG. 13 are tested.

In data shown in FIG. 12, the center of gravity of a group of virtual records satisfying "weather=fine" is (50, 87.5). The sum of results each obtained by the square of a distance from the center of gravity of the group of virtual records to the center of gravity of all records is 1075.

The center of gravity of a group of virtual records satisfying "weather=rain" is (25, 55). The sum of results each obtained by the square of a distance from the center of gravity of the group of virtual records to the center of gravity of all records is 900. As a result, the degree of record dispersion is 1075+900=1975.

In data shown in FIG. 13, the center of gravity of a group of virtual records satisfying "time≦9:00" is (35, 82.5). The sum of results each obtained by the square of a distance from the center of gravity of the group of virtual records to the center of gravity of all records is 1575.

The center of gravity of a group of virtual records satisfying "time≦10:00" is (55, 65). The sum of results each obtained by the square of a distance from the center of gravity of the group of virtual records to the center of gravity of all records is 1700. As a result, the degree of record dispersion is 1575+1700=3275.

As described above, the division candidate of FIG. 12 is lower than the division candidate of FIG. 13 with respect to the value of degree of record dispersion, that is, it seems that the records congest to the division candidate of FIG. 12 than the division candidate of FIG. 13, so that the division candidate of FIG. 12 is selected as the second division.

The effect that the data of FIG. 10 is divided under conditions of "weather=fine" and "weather=rain" is stored in the record division history storage unit 150.

The data of FIGS. 11 and 12 cannot be divided under the conditions that the smallest record number n forming a group of records is 2 and the record of the same time is not divided. Therefore, at this point the process finishes.

In the above embodiment, it is thought that the records which are congested by division disperse when the degree of record dispersion of a group of records before dividing is smaller than that after dividing. Hence, the condition that division of the records is not done may be set.

By the above-mentioned operation, in the record division history storage unit 150 is recorded a decision tree structure indicating that the group of records should be divided with any kind of division condition (node) in order to find a group of congested records, i.e., a leaf. The decision tree structure generated by the above embodiment is shown in FIG. 14.

If the position of a record of a leaf of the tree structure and the conditions (nodes) for reaching the leaf are enumerated, the following rules are established: "a passenger can often be picked up at the lower right of the map (FIG. 2) at and after 18:00 hours," "a passenger can often be picked up at the top of the map (FIG. 2) if it is fine at and before 12:00 hours," and "a passenger can often be picked up at the lower left of the map (FIG. 2) if it is rainy at and before 12:00 hours."

In other words, according to the present embodiment, it is possible to find at the same time "a certain condition" and "a certain region" of a rule that "data to satisfy a certain condition congests on a certain region."

The above embodiment performs data analysis based on two-dimensional data. However, data analysis may be performed based on multi-dimensional data, for example, three-dimensional data. The region where data congest three-dimensionally is detected using internal data provided by CT (computed tomography) or MRI (magnetic resonance imaging) to use for diagnosis. For example, a diagnosis apparatus for diagnosing an internal fatigue by three-dimensionally detecting congestion of lactic acid in a body may be realized using the present invention.

The process in the present embodiment can be executed by a computer executable program. This program may be stored in a computer readable memory medium and executed by a computer.

This memory medium may use a magnetic disc, a flexible disk, a hard disk, an optical disk (CD-ROM, CD-R, DVD), a magneto-optical disk (MO), and a semiconductor memory in which the programming can be stored.

OS (operating system) executed by a computer according to a program installed in the computer from a memory medium, database management software, or MW (middleware) such as a network may execute a part of each process for realizing the present embodiment.

This memory medium is not limited to a medium independent of a computer and includes a memory medium on which a program transmitted by LAN or Internet is downloaded and stored or temporarily stored.

The memory medium is not limited to a single medium, and a plurality of memory mediums may be used for executing a process in the present embodiment.

The computer is a computer that executes each process in the present embodiment according to a program stored in a memory medium. The computer may be a single apparatus comprising a personal computer or a system wherein a plurality of personal computers are connected via a network.

The computer is not limited to a personal computer and is an apparatus including an arithmetic processing unit, a microcomputer and so on which are included in data processing equipment and realizing facility of the present invention by a program.

According to the present invention, a place where data having a spatial attribute are congested and a condition for looking for the place can be found at the same time.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A spatial data analysis apparatus comprising:
    a storage configured to store a record group of records each including a multi-dimensional spatial attribute containing a place and a description attribute regarding the spatial attribute;
    a divider configured to divide the record group into a plurality of virtual record groups corresponding to a plurality of places according to each of a plurality of conditions determined by the description attribute;
    a calculator configured to calculate a degree of spatial dispersion of records of each of the plurality of virtual record groups in the places to obtain a plurality of degrees of dispersion; and
    a selector configured to select from the conditions a condition corresponding to a virtual record group that indicates a lowest degree of dispersion among the degrees of dispersion, and wherein
    the divider re-divides the virtual record group into a plurality of re-divided virtual record groups; and
    the calculator computes a degree of spatial dispersion of records of each of the re-divided virtual record groups that are recursively generated by re-dividing recursively the virtual record group with the divider, to make a tree structure for determining a final division condition and a final virtual record group.

2. The spatial data analysis apparatus according to claim 1, which further includes a storage configured to store the selected condition and a history of the virtual record group, and a temporary storage configured to store temporarily the virtual record group.

3. The spatial data analysis apparatus according to claim 1, wherein the divider is configured to re-divide the virtual record group selected by the selector to generate a plurality of re-divided record groups, and the calculator calculates a degree of spatial dispersion of records of each of the plurality of re-divided record groups to obtain a plurality of degrees of re-dispersion and determine a re-division condition and a re-divided record group that indicate a lowest degree of dispersion among the plurality of degrees of re-dispersion.

4. The spatial data analysis apparatus according to claim 1, wherein the degree of spatial dispersion is determined by the sum of values each obtained by square of a distance between a center of gravity of a group of all records and a center of gravity of each of the records.

5. A computer-implanted spatial data analysis method comprising:
    storing in a storage a record group of records each including a multi-dimensional spatial attribute containing a place and a description attribute regarding the spatial attribute;
    dividing the record group into a plurality of virtual record groups corresponding to a plurality of places according to each of a plurality of conditions determined by the description attribute;
    computing a degree of spatial dispersion of records of each of the plurality of virtual record groups in the places to obtain a plurality of degrees of dispersion;
    selecting from the conditions a condition corresponding to a virtual record group that indicates a lowest degree of dispersion among the degrees of dispersion;
    re-dividing the virtual record group into a plurality of re-divided virtual record groups; and
    computing with said computer a degree of spatial dispersion of records of each of the re-divided virtual record groups that are recursively generated, to make a tree structure for determining a final division condition and a final virtual record group.

6. The spatial data analysis method according to claim 5, wherein the multi-dimensional attribute is a two-dimensional spatial attribute.

7. The spatial data analysis method according to claim 5, wherein the spatial attribute includes two-dimensional coordinates and the description attribute includes a condition.

8. The spatial data analysis method according to claim 5, which further includes storing the selected condition and a history of the virtual record group in a storage unit, and storing temporarily the virtual record group in a temporary storage unit.

9. The spatial data analysis method according to claim 5, wherein dividing the record group includes re-dividing virtually the selected virtual record group into a plurality of re-divided record groups, and calculating the degree of spatial dispersion includes calculating a degree of spatial dispersion of records of each of the plurality of re-divided record groups to obtain a plurality of degrees of re-dispersion and determining a re-division condition and a re-divided record group that indicate a lowest degree of dispersion among the plurality of degrees of re-dispersion.

10. The spatial data analysis method according to claim 5, wherein the degree of spatial dispersion is determined by the sum of values each obtained by square of a distance between a center of gravity of a group of all records and a center of gravity of each of the records.

11. A computer readable storage medium storing a spatial data analysis program which when executed by a computer causes the computer to perform steps comprising:

storing in a storage a record group of records each including a multi-dimensional spatial attribute containing a place and a description attribute regarding the spatial attribute;

dividing the record group into a plurality of virtual record groups corresponding to a plurality of places according to each of a plurality of conditions determined by the description attribute;

dividing a degree of spatial dispersion of records of each of the plurality of virtual record groups in the places to obtain a plurality of degrees of dispersion;

select selecting from the conditions a condition corresponding to a virtual record group that indicate a lowest degree of dispersion among the plurality of degrees of spatial dispersion;

dividing virtually the selected virtual record group into a plurality of re-divided virtual record groups; and computing a degree of spatial dispersion of records of each of the re-divided virtual record groups that are recursively generated, to make a tree structure for determining a final division condition and a final virtual record group.

12. The computer readable medium according to claim 11, wherein the spatial data analysis program when executed by a computer causes the computer to perform further steps storing the selected condition and a history of the virtual record group in a storage unit, and storing temporarily the virtual record group in a temporary storage unit.

13. The computer readable medium according to claim 11, wherein the spatial data analysis program when executed by the computer causes the computer to perform further steps comprising determining the degree of dispersion by the sum of values each obtained by square of a distance between a center of gravity of a group of all records and a center of gravity of each of the records.

14. The computer readable medium according to claim 11, wherein the multi-dimensional spatial attribute is a two-dimensional spatial attribute.

15. The computer readable medium according to claim 11, wherein the spatial attribute indicates two-dimensional coordinates and the description attribute indicates a condition.

* * * * *